Nov. 14, 1961  B. B. BOND  3,008,571
CORD AND CLIP THEREFOR
Filed July 18, 1960
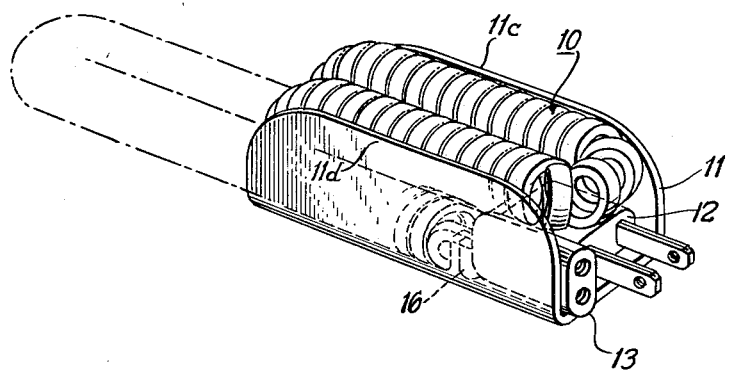
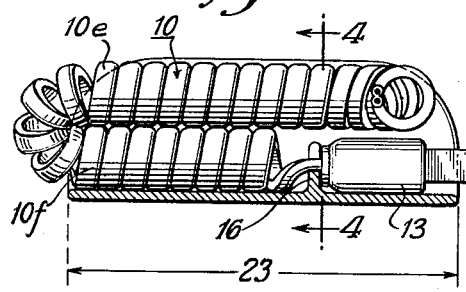 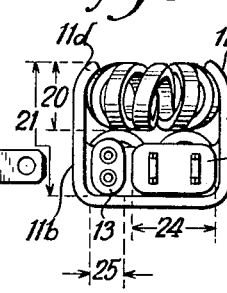 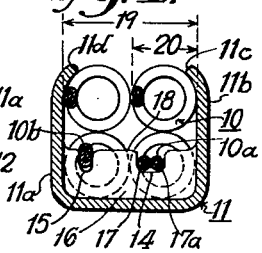
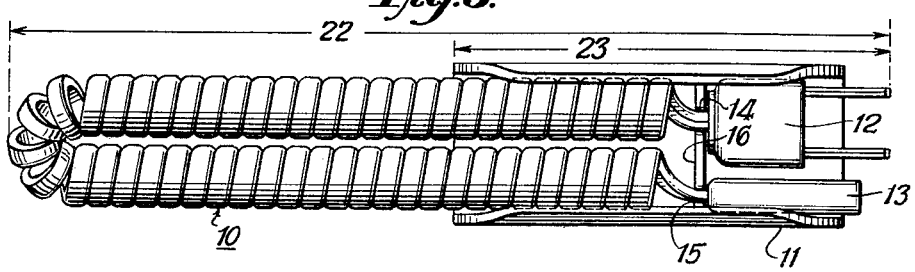
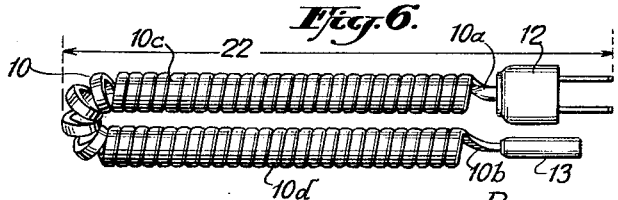
INVENTOR.
BEVERLY B. BOND.
BY
ATTORNEYS.

United States Patent Office 3,008,571
Patented Nov. 14, 1961

3,008,571
CORD AND CLIP THEREFOR
Beverly B. Bond, South Norwalk, Conn., assignor to Ronson Corporation, Woodbridge, N.J., a corporation of New Jersey
Filed July 18, 1960, Ser. No. 43,531
8 Claims. (Cl. 206—46)

This invention relates to an electric cord and a device for holding same, and more particularly to a coiled electric cord and a channel-like device in which such cord can be easily and compactly nested.

This invention is advantageously used for the holding or storing of a coiled cord which, for example, is intended for use with an electric appliance, such as an electric shaver.

Heretofore one of the principal difficulties in properly packing and containing such appliances, such as an electric shaver, has involved the difficulty of packing and containing the electric cord which is employed therewith.

It is desirable to be able to pack or wind such a cord in a compact fashion in order that it can fit with ease within a container or housing for containing the device with which the cord is to be employed. It has been found difficult and inconvenient to do this in the past because of the nature and intractibility of such cord, the latter normally comprising metallic wire, such as copper, enclosed in a tube or sheathing of insulation which may be plastic or rubber or the like. The combined action of the metallic wire and its insulated covering, together with the bulk of the socket portions on opposite ends of the wire, has presented substantial problems in compactly arranging same by the user of the electric device, such as an electric shaver.

One of the objects of the present invention is to provide a novel electric cord and cord holding device for overcoming the above problems or for reducing them to insignificance.

Another object is to provide a novel electric cord and nesting channel therefor in which the cord can be nested with ease, and which can be easily used by a person with no skill in nesting curled cord of this type.

The invention, in one form thereof, comprises a precoiled electric cord having a male plug and a female socket connected on the opposite ends thereof, the coils of such precoiled cord being of a substantially uniform selected diameter. A channel member is provided in which the precoiled cord is nested in folded condition, the aforementioned plug and socket being held in relatively fixed preselected positions. Such channel member is open at the ends and at the top thereof and the upper edges of the channel sides are inturned sufficiently for releasably holding the precoiled cord in such nested condition as will now be set forth. Both the depth and the width of the channel member is substantially twice the aforementioned preselected coil diameter and the length of the channel is substantially one-quarter the length of the unstretched but precoiled cord, whereby the latter can be first folded double with the ends in alignment, thereafter folded over itself once again to provide four adjacent coiled portions which are nestable in the channel member and which are retained removably therein by the aforementioned inturned upper edges of the channel sides. Preferably the channel member is provided with a partition extending transversely across the bottom thereof and having formed therein a pair of slots for receiving the opposite extremities of the precoiled cord at the necks thereof adjacent their respective sockets.

The above and further novel features of the invention will appear more fully below from the detailed description when read in connection with the accompanying drawings, it being understood that the latter are for purposes of illustration only and do not define the limits of the invention, reference for this latter purpose being had to the appended claims.

In the drawings:
FIG. 1 is a perspective view of one form of device embodying the present invention;
FIG. 2 is a side elevation of the device shown in FIG. 1;
FIG. 3 is an end view of the device shown in FIG. 1;
FIG. 4 is a sectional view taken substantially along line 4—4 of FIG. 2;
FIG. 5 is a top plan view of the embodiment of FIG. 1 showing the electric cord folded double with the ends in alignment but with a portion of such cord protruding beyond the channel member and prior to the cord being folded over upon itself once again to provide the four adjacent coiled portions as in FIG. 1; and
FIG. 6 is a plan view on a somewhat reduced scale of an electric cord, such as that shown in FIG. 5 but shown alone, the cord being folded double with the ends in alignment.

Referring to the drawings in greater detail, the invention, in one form thereof, comprises the combination of a precoiled cord 10 which is nestable within a channel 11 which is sometimes referred to as a cord clip and which may be composed of, for example, a colorless plastic substance. The electric cord 10 is preformed during manufacture in tightly coiled or curled configuration as shown in FIG. 6 and is provided at one end with a male plug 12 and at the other end with a female socket 13. The cord 10 if pulled taut, thereby to straighten out its curls, upon release of tension, will resume its curled shape due to the resilience thereof. The male plug 12 and female socket 13 are respectively connected to the cord 10 at neck portions 10a and 10b (FIG. 6) which comprises the opposite ends of the coiled wire. Such neck portions 10a and 10b, as shown in FIG. 4, may be positioned respectively in slots 14 and 15 formed in a partition 16, thereby to facilitate the nesting within the channel 11 along the bottom thereof of the plug 12 and socket 13, as illustrated in FIGS. 2–4. The electric cord 10 includes two metal wires 17 and 17a which are respectively covered with insulation, such as rubber or plastic or the like, and the cross-sectional shape of the cord 10, as shown in FIG. 4, is flat with rounded ends. The insulated covering for the two wires 17 and 17a is an integral one thereby holding the wires in spaced relation throughout the length thereof.

The slots 14 and 15 are preferably shaped so that the neck portion 10a of the cord 10 is held in horizontal poistion parallel to the bottom of the channel 11 as viewed in FIG. 4, and the neck portion 10b in turn is held in a vertical position as viewed in the same figure. This relative attitude of the slots 14 and 15 for so holding the neck portions 10a and 10b aids in the nesting of the plug 12 and socket 13 whereby they easily assume the attitude as shown in the drawings and without the need for any special skill.

The width or horizontal dimension of the slot 14 (FIG. 4) is substantially equal to the major dimension of the cross-section of the cord 10, and the vertical dimension or depth of such slot is substantially equal to the minor dimension of the cross-section of the cord 10. Analogously, the width or horizontal dimension of the slot 15 is substantially equal to the aforementioned minor dimension of the cord 10 and the depth or vertical dimension of such slot is substantially equal to the major cross-sectional dimension of such cord.

Referring to the position of the partition 16 with respect to the ends of the channel 11, in FIGS. 1 and 2 such partition may be positioned whereby the plug 12 and socket 13 are substantially fully within the channel 11. However, the end portions of such plug and socket may slightly protrude from the channel, if desired, and in the manner shown.

The aforementioned slots 14 and 15 further are formed whereby the center in the upper region of the partition 16 of slot 14 is spaced from side 11b of the channel 11 by a distance equal to one-half of the length of the cross-section of the plug 12. Thus the nesting of the male plug 12 in the attitude shown is facilitated. The position of the slot 15 is analogously selected to facilitate the nesting of the socket 13 in the attitude shown.

Referring to FIGS. 3 and 4, the width 19 of the channel 11, as measured internally thereof, is substantially twice the dimension 20 which comprises the diameter of a coil of cord 10. Such dimension 20 is uniform throughout, the coils thus being circular as viewed on end, as in FIG. 4. Analogously, the depth 21 of the channel 11 as measured internally thereof is substantially twice the aforementioned dimension 20.

The partition 16 and its slots 14 and 15 thus provide a means for positioning accurately the connectors 12 and 13 and are easily employed by a casual user with no skill in assembling curled cord of this type.

Also, in order removably to hold cord 10 in nested relation in the channel 11 (FIG. 1), upper edge portions 11c and 11d (FIG. 4) of the channel sides 11a and 11b respectively are inwardly turned.

Referring again to the dimensions of the precoiled cord 10 and the channel or clip 11, reference is made to FIGS. 5 and 6 wherein the dimension 22 (comprising substantially one-half the length of the cord 10 and its end connectors 12 and 13) is illustrated, such dimension being substantially twice the dimension 23 comprising the length of the channel 11.

The dimension 23 of the channel 11 is thus substantially one-quarter of the length of the coiled cord and its end connectors when in an unfolded condition, namely, when portions 10c and 10d (FIG. 6) are in alignment with one another, but with the curls or coils remaining.

Referring to FIG. 3, the major dimension 24 of the plug 12, plus the minor dimension 25 of the socket 13, equal substantially twice the aforementioned coil diameter 20.

In operation, the precoiled cord 10 first is folded double into the attitude shown in FIG. 6. The neck portions 10a, 10b thereof are next positioned in the slots 14, 15 (FIGS. 2, 4 and 5) in the attitude shown. At this time the channel 11 and the cord 10 are in the relative attitude of FIG. 5, there being a substantial portion of the cord 10 protruding to the left of and beyond the channel 11 from the lower region thereof. Thereafter, the cord 10, as positioned in FIG. 5, is folded over upon itself once again into the attitude shown in FIGS 1-4, thereby to provide four interconnected adjacent coiled portions which are fully nested in the channel 11, the inturned upper lips 11c and 11d (FIG. 3) releasably retaining such four coiled portions in such nested relation. When folding the cord 10 from the attitude of FIG. 5 into the attitude of FIG. 2, the uppermost two coils (FIG. 2) may be easily pressed downwardly into nested position despite the existence of the inturned edges or lips 11c and 11d, this being possible by virtue of the resilient nature of the coiled cord.

One of the features of the invention which facilitates proper nesting of the cord 10 in the channel 11 comprises the attitude of the flattened cross-sectional shape of such cord 10 when in its coiled condition. The cord consists, as aforementioned, of a pair of wires 17 and 17a sheathed within a suitable covering of insulation material (FIG. 4). The cross-section of the sheathed wires or cord is elongated and flat, the cord having coils or curls of a selected diameter formed therein, such coils being flattened in a direction parallel to the axis of the cord when the latter is straight with the curls of the cord still remaining. Thus the cord 10 is readily nestable within the channel 11 whereby, as is well shown in FIG. 2, the flattened surfaces of the upper and lower tiers 10e and 10f of the cord 10 are adjacent one another. This has the advantage of inhibiting the coils of the upper tier 10e from being thrust down between the coils of the lower tier 10f. This not only facilitates the proper nesting of the cord when it is placed within the channel 11, but aids in disengaging the cord from the channel in an orderly manner and without tangles.

What is claimed is:

1. In a device of the class described, the combination comprising: a coiled cord of insulated electric wire having a male plug and a female socket connected respectively to the opposite ends thereof, the coils of such coiled cord being of a substantially uniform selected diameter and thus being circular as viewed on end, a channel member releasably holding in nested relation therein said coiled cord in folded condition and also holding said plug and socket in relatively fixed preselected positions, said channel member being open at the ends and top and having edge portions of the sides thereof inturned to a degree adequate for so holding said cord in such nested relation, both the depth and width of such channel member being substantially twice the aforementioned preselected coil diameter, the length of said channel being substantially one-fourth the length of said coiled cord plus the lengths of said plug and socket, said cord being nested releasably in said channel member in four connected adjacent coiled portions, two positioned along the bottom of said channel member and two along the top thereof spaced from said bottom, the axes of which coiled portions are parallel, and which axes collectively form the four corners of a square as viewed in a transverse cross-section of said four nested coiled portions, said inturned edge portions of said channel member partially covering the aforementioned two coiled portions spaced from the bottom of said channel member.

2. A channel member in accordance with claim 1 and having a partition extending transversely across the bottom thereof, such partition having formed therein a pair of slots for receiving the opposite extremities of the said coiled cord at the necks thereof adjacent their respective plug and socket.

3. A channel member in accordance with claim 2 wherein said partition is positioned a distance from one extremity thereof substantially equal to the length of said male plug.

4. In a device of the class described, the combination comprising: a precoiled cord of insulated electric wire, the coils of such precoiled cord being of a substantially uniform selected diameter, a channel member releasably holding said cord in folded condition, said channel member being open at the ends and top and having edge portions of the sides thereof inturned which so releasably hold said cord in said channel member, both the depth and width of such channel member being substantially twice the aforementioned preselected coil diameter, said cord being nested releasably in said channel member in four connected adjacent coiled portions, two positioned along the bottom of said channel member and two along the top thereof spaced from said bottom, the coils of any one of which coiled portions are contiguous to and in contact with the coils of two of the other coiled portions, the axes of said coiled portions being parallel and forming the four corners of a square as viewed in transverse cross-section of said four nested coiled portions.

5. A channel member in accordance with claim 4 and having a partition extending transversely across the bottom thereof, such partition having formed therein a pair of depressions for receiving the opposite extremities of the said precoiled cord at the necks thereof, such depressions being substantially similar in dimensions to those of the cross-section of said cord.

6. A device in accordance with claim 4 wherein said cord is provided at the ends thereof with a plug and a socket and said channel member is provided with a partition which is positioned a distance from one extremity thereof substantially equal to the length of said plug, and the height of said partition is selected to enable the nesting of said plug and socket along the bottom of said channel member.

7. Device in accordance with claim 1 wherein said cord consists of a pair of wires embedded within an integral covering of insulation, said cord being of the coiled type and having its coils flattened in a direction parallel to the axis of the coil thereby to facilitate nesting of such coil.

8. Device in accordance with claim 4 wherein said cord consists of a pair of wires embedded within a covering of insulation material, the cross-section of the cord being elongated and flat, said cord being precoiled and having its coils flattened in a direction parallel to the axis of such cord when the latter is straight but coiled, whereby said cord is readily nestable within said channel member having a width and depth substantially twice the diameter of a coil of said cord.

References Cited in the file of this patent

UNITED STATES PATENTS

| | | |
|---|---|---|
| 2,271,057 | Barrans | Jan. 27, 1942 |
| 2,351,379 | Wehringer | June 13, 1944 |

FOREIGN PATENTS

| | | |
|---|---|---|
| 684,809 | Germany | Dec. 6, 1939 |